United States Patent [19]

Diener et al.

[11] Patent Number: 4,699,305

[45] Date of Patent: Oct. 13, 1987

[54] BELT FOR A CABLE DRIVE SYSTEM

[75] Inventors: Walter C. Diener, Leyden Township, Cook County; Tommy L. Gaubatz, Vernon Hills; Michael S. Stiefel, Skokie, all of Ill.

[73] Assignee: Illinois Tool Works Inc., Chicago, Ill.

[21] Appl. No.: 774,672

[22] Filed: Sep. 11, 1985

[51] Int. Cl.[4] ............................................. B65H 49/00
[52] U.S. Cl. ..................................... 226/170; 226/172
[58] Field of Search ............... 226/170, 171, 172, 173; 198/844

[56] References Cited

U.S. PATENT DOCUMENTS 1,941,993  1/1934  Minton ................................. 226/170
4,274,574  6/1981  Bishop ................................. 226/170

FOREIGN PATENT DOCUMENTS 1059644  3/1957  Fed. Rep. of Germany ...... 226/173

Primary Examiner—Stuart S. Levy
Assistant Examiner—Lynn M. Sohacki
Attorney, Agent, or Firm—Donald D. Mondul; D. I. Roche; T. W. Buckman

[57] ABSTRACT

A drive belt for a linear motion drive system in which a plurality of drive belts are helically disposed and rotated about a driven element to axially advance the element along its axis. The belts include a pair of resilient legs which operate to equally space the belts about the periphery of the driven element. The resilient legs also are adapted to accommodate changes in diameter of the driven element.

3 Claims, 4 Drawing Figures

BELT FOR A CABLE DRIVE SYSTEM

BACKGROUND AND SUMMARY OF THE INVENTION

This invention relates to drive belts, and in particular to drive belts for use in a linear motion cable drive mechanism in which a plurality of drive belts are helically wrapped around a driven element. An example of such a cable drive mechanism is shown in U.S. Pat. No. 4,274,574. Such mechanisms employ a plurality of drive assemblies, each including a set of pulleys and a drive belt, to advance an elongated driven element along its longitudinal axis. Each of the drive belts is wrapped helically about the driven element such that simultaneous rotation of the assemblies and lengthwise movement of the drive belts causes advancement of the driven element without rotation thereof.

The path travelled by drive belts in such systems causes the belts to undergo a variety of stresses. Fleet angle fluctuations, small pulley radii, and substantial twisting of the drive belts are examples of factors which contribute to difficulties in belt design.

A characteristic of cable drive systems which utilize helically disposed belts is that as tension in the belts increases, there is a tendency for the belts to straighten, and for the driven element to disengage itself from contact with the drive belts. It is desirable to maintain even spacing of the drive belts about the driven element. Furthermore, because variations in diameter in the driven element, there is a need to balance circumferential forces between the belts.

Drive belts made in accordance with the present invention satisfy the above requirements, and a preferred embodiment of the invention comprises a continuous loop of water resistant material with at least one encapsulated strength member inside. The belt has two resilient legs which abut legs of adjacent belts to insure even spacing of a plurality of belts when the belts are helically wrapped around a driven element. A belt of the present invention may have a generally W-shaped cross section.

These and other aspects of the invention will be better understood after a reading the following specification in conjunction with the accompanying drawings.

DETAILED DESCRIPTION OF THE INVENTION

Figure 1:
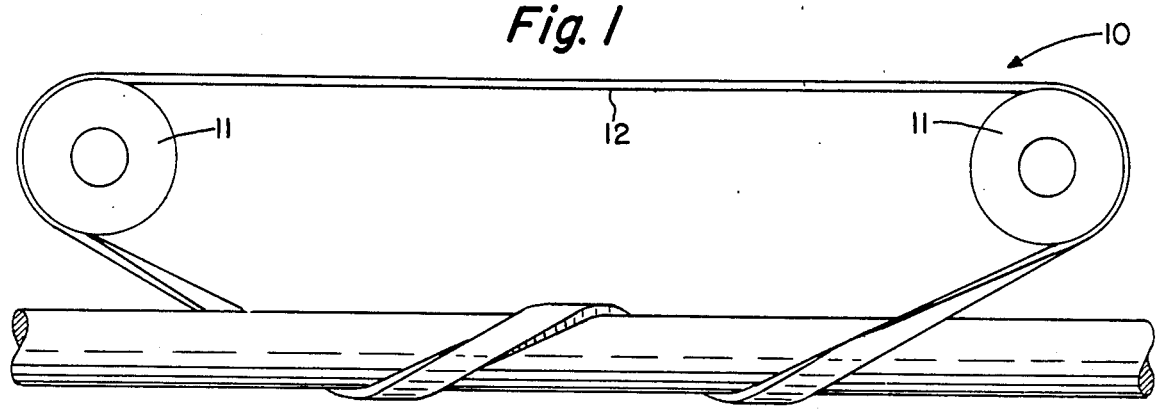
FIG. 1 is a side elevational view in partial section showing a portion of a drive system in which the present invention is usable.

FIG. 1 shows a drive assembly of the type described in more detail in U.S. Pat. No. 4,274,574 to Bernard F. Bishop (hereinafter referred to as the "Bishop patent"), which is incorporated herein by reference. The Bishop patent describes a linear drive mechanism in which a plurality of drive assemblies are used to advance a driven element along its axis without imparting rotational movement thereto.

FIG. 1 shows a drive assembly 10, similar to the one of the Bishop patent, comprised of a pair of pulleys 11 and a belt 12. For purposes of illustration, the belt 12 in FIG. 1 is shown schematically as a flat member in order to show the twisting which necessarily occurs between each of the pulleys 11 and the driven element 14. A complete drive system is usually comprised of a plurality of belts which substantially surround the driven element 14.

Figure 2:
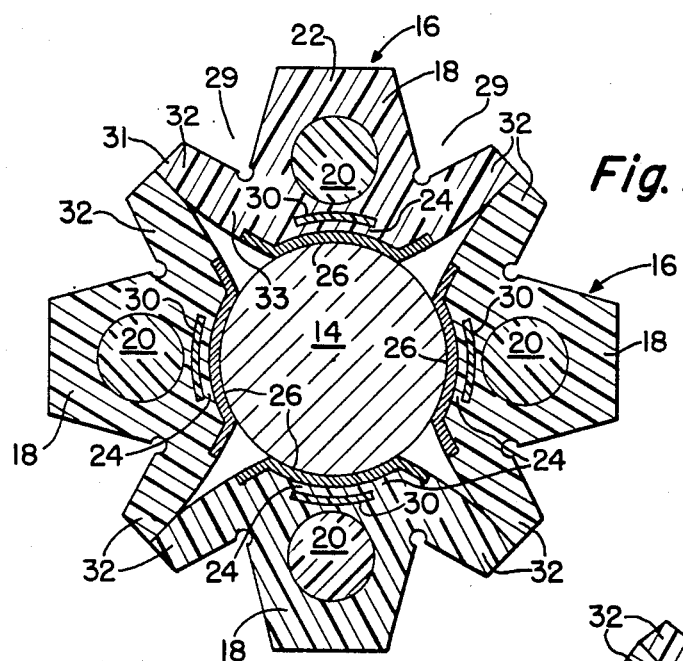
FIGS. 2, 3 and 4 are cross sectional views of driven elements of various diameters driven by belts of the present invention.

FIG. 2 shows a driven element 14 with four W-shaped belts 16 disposed at equal intervals about the circumference thereof. Each belt 16 is comprised of a molded polyurethane outer portion or casing 18 and a strength member 20 having a generally circular cross section, preferably comprised of a low elongation DACRON ® material. The strength member 20 is centered in an enlarged or protuberant body portion 22 of the belt 16. The legs 32 define a large groove 29 on the upper part of the belt 16. The groove 29 is separated into two parts by the protuberant body portion 22 and the strength member 20.

The inner portions 24 of the belts contact the driven element, and preferably have a surface reinforcement 26 made of woven nylon fabric. Between the reinforcement 26 and the strength member 20 is a second strength member 30 made of an aromatic polyamide material such as KEVLAR ® ribbon. The flexible legs 32 are generally tapered such that outer portions 31 are thinner than inner portions 33 thereof. It should be noted that the body portion 22 is similarly tapered. The inner portion 24 of the belt 16 is generally molded to an arcuate shape matches the curvature of the driven element 14 as shown in FIG. 2.

Figure 3:
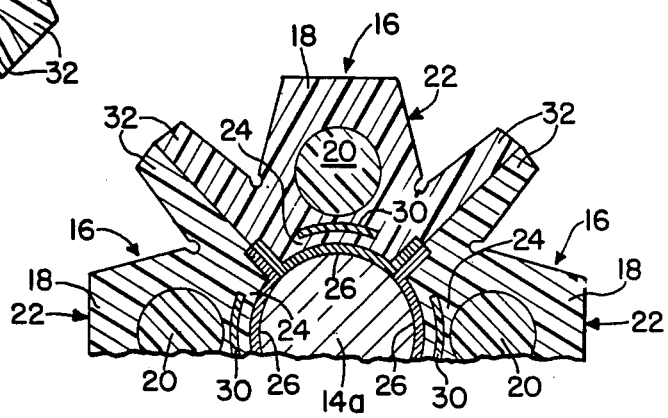

Driven elements of the type contemplated for use with the present invention, generally include some sections of varying cross sectional diamter. The driven element shown in FIGS. 2, 3 and 4 has a diameter which varies from a minimum of 11/15" as shown in FIG. 3 to a maximum of $1\frac{1}{8}$" in FIG. 4. However, most of the belt has a diameter of 1" as shown in FIG. 2. In FIG. 2 the belts 16 are shown surrounding a normal section of a driven element 14. In FIG. 2 the legs 32 are in light abutting contact with legs of adjacent belts. Such abutting contact tends to equally space the plurality of belts 16 about the driven element 14. Also, the inner portion 24 of the belt 16, particularly the part containing the fabric 26 is in continuous contact with the periphery of the driven element 14. It should be noted that the vast majority of the driven element 14 has a cross section of the type shown in FIG. 2. Therefore, the normal configuration of the legs 32 is in the slightly flexed configuration shown in FIG. 2.

FIG. 3 shows a narrowed section 14a of the driven element 14 with a diameter substantially less than the diameter of the element as shown in FIG. 2. When the belts 16 surround a narrowed section 14a of the driven element 14, the legs 32 are in significantly increased abutting contact. Nevertheless, the inner portion 24 of each belt, and the corresponding fabric 26, conform to the smaller shape of the narrowed section 14a. The legs 32 are sufficientl.y resilient to allow the inner portions 24 to move inwardly when a narrowed section 14a is encountered. The centering function of the legs operates to equally space the belts 16 about the periphery of the narrowed section 14a of the driven element 14.

Figure 4:
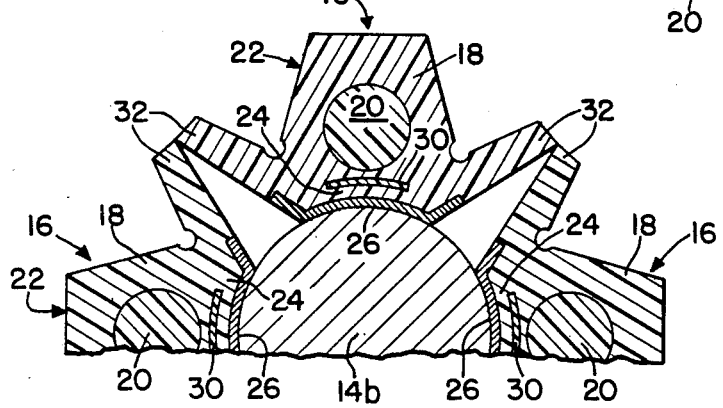

FIG. 4 shownws an enlarged section 14b of the driven element 14. In this case, the legs 32 of adjacent belts 16 may only be adjacent, or in very slight abutting contact. Again, the resilient nature of the casing 18 allows the inner portions 24 and the associated fabric 26 to conform to the enlarged (less curved) section 14b of the driven element 14. When an enlarged section 14b of the driven element 14 is encountered, the resilient legs 32 again serve to equally space the belts around the driven element 14. The belts in the vicinity of the fabric are resilient enough to conform to the radius of curvature of the driven member, i.e. ¾", ½", and 9/16" in FIGS. 2, 3 and 4 respectively.

In the embodiment of the invention as shown in FIGS. 2, 3 and 4, the flat strength member 30 tends to evenly distribute radially inward forces. Because of the frequent flexing of the legs 32, the juncture 28 between the leg 32 and its associated body portion 22 is provided with a fillet in order to reduce stress concentrations and the likelihood of tearing. It should be noted that stopping and starting of the drive assemblies causes significant variations in fleet angle where the belts meet associated pulleys. The flexible nature of the resilient legs 32 in addition to providing spacing function discussed above, reduces belt wear caused by fleet angle variations.

It should be noted that while the belt shown in FIGS. 2, 3 and 4 includes a large protuberant body portion 22, it may be desirable to reduce the overall thickness of the belt by eliminating the round strength member 20, leaving only the flat strength member 30. In such a configuration only the large groove 29 would separate the resilient legs 32.

The above description of the preferred embodiments of the present invention are but examples of the may alternatives, variations, and modifications which are intended to be within the scope of the appended claims.

We claim:

1. A set of drive belts for a linear cable drive mechanism in which a plurality of drive belts are helically wrapped around a generally elongated driven element, said set of belts comprising a plurality of at least two belts, each of said two belts comprising a continuous loop of water resistant material, and each including a pair of continuous resilient legs joined by a continuous central section, said central section having a continuous curved bearing surface for frictionally engaging a driven element, adjacent legs of adjacent belts forming means for positioning said belts in a generally symmetrical pattern about said driven element.

2. A set of belts in accordance with claim 1 wherein each belt has at least one encapsulated strength member within said material.

3. A set of belts in accordance with claim 2 wherein said bearing surface is curved in planes normal to the axis of said belt and is capable of assuming a plurality of radii of curvature in said planes.

* * * * *